(12) United States Patent
Zhao et al.

(10) Patent No.: US 10,692,425 B2
(45) Date of Patent: Jun. 23, 2020

(54) ORGANIC LIGHT-EMITTING DIODE (OLED) DISPLAY PANEL AND CONTROLLING METHOD

(71) Applicant: Lenovo (Beijing) Co., Ltd., Beijing (CN)

(72) Inventors: Qian Zhao, Beijing (CN); Lai Wei, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 43 days.

(21) Appl. No.: 15/993,844

(22) Filed: May 31, 2018

(65) Prior Publication Data

US 2019/0005871 A1 Jan. 3, 2019

(30) Foreign Application Priority Data

Jun. 30, 2017 (CN) .......................... 2017 1 0522817

(51) Int. Cl.
| | | |
|---|---|---|
| *G09G 3/3208* | (2016.01) | |
| *G06F 1/3234* | (2019.01) | |
| *G06F 3/041* | (2006.01) | |
| *G06K 9/00* | (2006.01) | |

(52) U.S. Cl.
CPC ......... *G09G 3/3208* (2013.01); *G06F 1/3265* (2013.01); *G06F 3/0412* (2013.01); *G06F 3/0416* (2013.01); *G06K 9/0002* (2013.01); *G06K 9/00067* (2013.01); *G09G 2330/021* (2013.01)

(58) Field of Classification Search
CPC .... G06F 1/3265; G06F 3/0412; G06F 3/0416; G09G 2330/021; G09G 3/3208; G06K 9/00067; G06K 9/0002
See application file for complete search history.

(56) References Cited

U.S. PATENT DOCUMENTS

| | | | | |
|---|---|---|---|---|
| 2012/0262408 A1* | 10/2012 | Pasquero | ............... | G06F 3/0412 345/174 |
| 2013/0074000 A1* | 3/2013 | Liu | ..................... | G06F 3/04883 715/781 |
| 2015/0109214 A1* | 4/2015 | Shi | ......................... | G06F 3/044 345/173 |
| 2016/0026280 A1 | 1/2016 | Wu et al. | | |
| 2017/0193270 A1* | 7/2017 | Zhang | ................ | G06K 9/00013 |
| 2017/0316248 A1* | 11/2017 | He | ..................... | G06K 9/00006 |
| 2018/0277065 A1* | 9/2018 | Zuo | ......................... | G06F 21/32 |
| 2019/0056613 A1* | 2/2019 | Wang | ................ | G02F 1/134309 |

FOREIGN PATENT DOCUMENTS

| | | |
|---|---|---|
| CN | 104360775 A | 2/2015 |
| CN | 106874892 A | 6/2017 |

\* cited by examiner

*Primary Examiner* — Ariel A Balaoing
(74) *Attorney, Agent, or Firm* — Anova Law Group, PLLC

(57) ABSTRACT

An OLED display panel and a controlling method thereof are provided. A touch control signal obtained by a touch control assembly is acquired. The touch control signal indicates a contact between an operation body and the OLED display panel. A target touch control area is determined based on the touch control signal. At least one pixel, which is included in a display assembly and corresponding to the target touch control area, is controlled to be in a non-active state.

12 Claims, 5 Drawing Sheets

ORGANIC LIGHT-EMITTING DIODE (OLED) DISPLAY PANEL AND CONTROLLING METHOD

CROSS-REFERENCES TO RELATED APPLICATIONS

This application claims the priority of Chinese patent application No. 201710522817.9, filed on Jun. 30, 2017, the entire content of which is incorporated herein by reference.

FIELD OF THE DISCLOSURE

The present disclosure generally relates to the field of display technology and, more particularly, relates to an organic light-emitting diode (OLED) display panel and a controlling method thereof.

BACKGROUND

Organic light-emitting diodes (OLEDs) are featured with self-luminosity, backlight-free, high contrast, thin thickness, wide viewing angle, fast response, flexibility, wide temperature range accommodation, simple structure, and simple fabrication process, etc. Thus, OLEDs are considered as the next generation technology of flat panel displays for emerging applications. However, the power consumption of OLED display screens is highly desired to be reduced.

The disclosed OLED display panel and controlling method thereof are directed to solve one or more problems set forth above and other problems.

BRIEF SUMMARY OF THE DISCLOSURE

One aspect of the present disclosure provides an OLED display panel controlling method. The controlling method comprises: acquiring a touch control signal obtained by a touch control assembly, wherein the touch control signal indicates a contact between an operation body and an OLED display panel; based on the touch control signal, determining a target touch control area; and controlling at least one pixel, which is included in a display assembly and corresponding to the target touch control area, to be in a non-active state.

Another aspect of the present disclosure provides an OLED display panel controlling method. The controlling method comprises: calling a fingerprint identification assembly, wherein the fingerprint identification assembly comprises a sensing device for acquiring a fingerprint and an identification device for identifying the fingerprint; and controlling at least one pixel, which is in a display assembly and corresponding to a target area of the sensing device, to be in a non-active state, thereby prompting contact at the target area for fingerprint input.

Another aspect of the present disclosure provides an organic light-emitting diode (OLED) display panel. The OLED display panel comprises: a touch control assembly; a display assembly; and a processor. The processor acquires a touch control signal obtained by the touch control assembly, wherein the touch control signal indicates a contact between an operation body and the OLED display panel; based on the touch control signal, determines a target touch control area, and controls at least one pixel, which is included in the display assembly and corresponding to the target touch control area, to be in a non-active state.

Another aspect of the present disclosure provides an organic light-emitting diode (OLED) display panel. The OLED display panel comprises: a fingerprint identification assembly, wherein the fingerprint identification assembly comprises a sensing device wherein the sensing device acquires a fingerprint and an identification device wherein the identification device identifies the fingerprint; and a processor wherein the processor calls the fingerprint identification assembly, and controls at least one pixel, which is in a display assembly and corresponding to a target area of the sensing device, to be in a non-active state, prompting contact at the target area for fingerprint input.

Other aspects of the present disclosure may be understood by those skilled in the art in light of the description, the claims, and the drawings of the present disclosure.

BRIEF DESCRIPTION OF THE DRAWINGS

To more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

Figure 1:
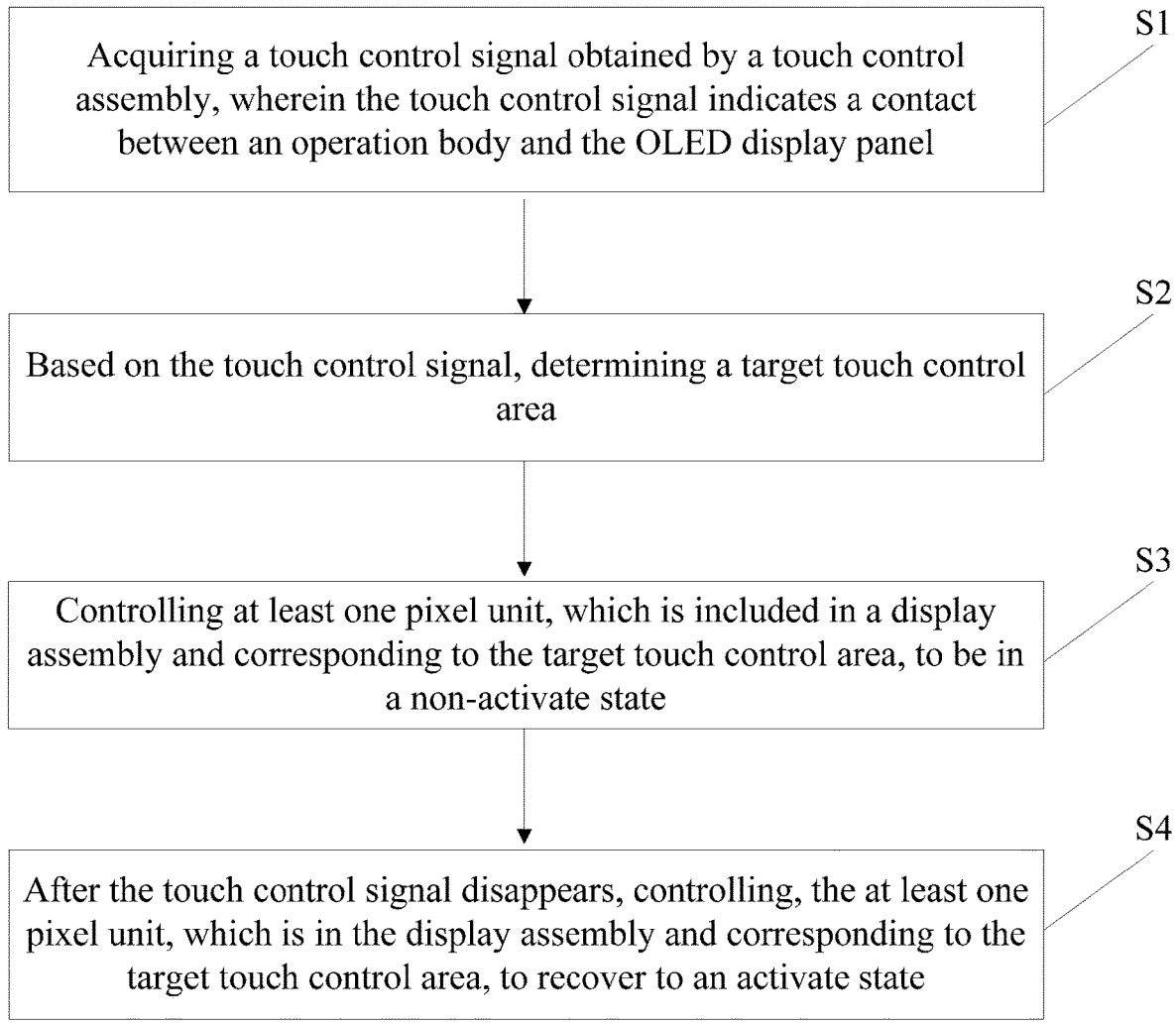
FIG. 1 illustrates a flow chart of an example organic light-emitting diode (OLED) display panel controlling method consistent with disclosed embodiments.

Reference will now be made in detail to example embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. It should be noted that the relative arrangement of the components and steps, the numerical expressions, and numerical values set forth in the example embodiments do not limit the scope of the present disclosure unless it is specifically stated otherwise.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an improved OLED display panel controlling method to reduce the power consumption of an OLED display panel.

FIG. 1 illustrates a flow chart of an example OLED display panel controlling method consistent with disclosed embodiments. As shown in FIG. 1, a touch control signal obtained by a touch control assembly of the OLED display panel is acquired, in which the touch control signal indicates a contact between an operation body and the OLED display panel (S1).

In the disclosed embodiments, the OLED display panel may comprise a touch control assembly, which may detect a touch control signal on a surface of the OLED display panel. The touch control signal may indicate a contact between an operation body and the OLED display panel.

After the touch control signal is acquired, a target touch control area is determined based on the acquired touch control signal (S2).

In one embodiment, determining the target touch control area based on the acquired touch control signal (i.e., S2) may further comprise: based on the acquired touch control signal, determining a touch control position and a touch control area of the acquired touch control signal (S202); and based on the determined touch control position and the touch control area of the acquired touch control signal, determining the target touch control area (S204). In particular, the target touch control area may be a contact area between the operation body and the OLED display panel.

After the target touch control area is determined, at least one pixel, which is included in a display assembly of the OLED display panel and corresponding to the target touch control area, is controlled to be in a non-active state (S3).

In the disclosed embodiments, the display assembly of the OLED display panel may comprise a plurality of pixels. In a period during which the operation body is in contact with the OLED display panel at the contact area, even the pixels corresponding to the contact area are in an active state, the operation body may be still unable to acquire the display content at the contact area (i.e., the content displayed at the contact area). Thus, in the disclosed embodiments, after determining the target touch control area, through controlling at least one pixel, which is included in the display assembly of the OLED display panel and corresponding to the target touch control area, to be in the non-active state, the power consumption of the OLED display panel may be reduced.

In one embodiment, controlling at least one pixel, which is in the display assembly and corresponding to the target touch control area, to be in the non-active state (i.e., S3) may further comprise: controlling one pixel, which is in the display assembly and corresponding to the target touch control area, to be in the non-active state, thereby reducing the power consumption of the OLED display panel.

In another embodiment, controlling at least one pixel, which is in the display assembly and corresponding to the target touch control area, to be in the non-active state (i.e., S3) may further comprise: controlling a plurality of pixels, which are in the display assembly and corresponding to the target touch control area, to be in the non-active state, thereby further reducing the power consumption of the OLED display panel.

In another embodiment, controlling at least one pixel, which is in the display assembly and corresponding to the target touch control area, to be in the non-active state (i.e., S3) may further comprise: controlling each pixel, which is in the display assembly and corresponding to the target touch control area, to be in the non-active state, thereby maximally reducing the power consumption of the OLED display panel.

In practical applications, the number of the pixels, which are corresponding to the target touch control area and are controlled to be in the non-active state, may be determined according to various application scenarios, as long as the area occupied by the non-active pixels does not extend beyond the target touch control area.

In the disclosed embodiments, in a period during which the operation body is in contact with the OLED display panel, at least one pixel, which is in the display assembly and corresponding to the target touch control area, may be controlled to be in the non-active state. However, each pixel corresponding to a non-target touch control area (i.e., an area beyond the target touch control area) may be still in the active state, thereby ensuring the normal display of each pixel corresponding to the non-target touch control area. The pixel may be any appropriate image displaying unit in the display assembly for displaying images or image elements.

After the touch control signal disappears, the at least one pixel, which is in the display assembly and corresponding to the target touch control area, is controlled to recover to the active state (S4). That is, after the touch control signal disappears, the at least one pixel, which is in the display assembly of the OLED display panel and corresponding to the target touch control area, may be controlled to recover to the active state, thereby ensuring the normal display of the at least one pixel at the target touch control area after the target touch control area is no longer covered/blocked by the operation body.

Figure 2:
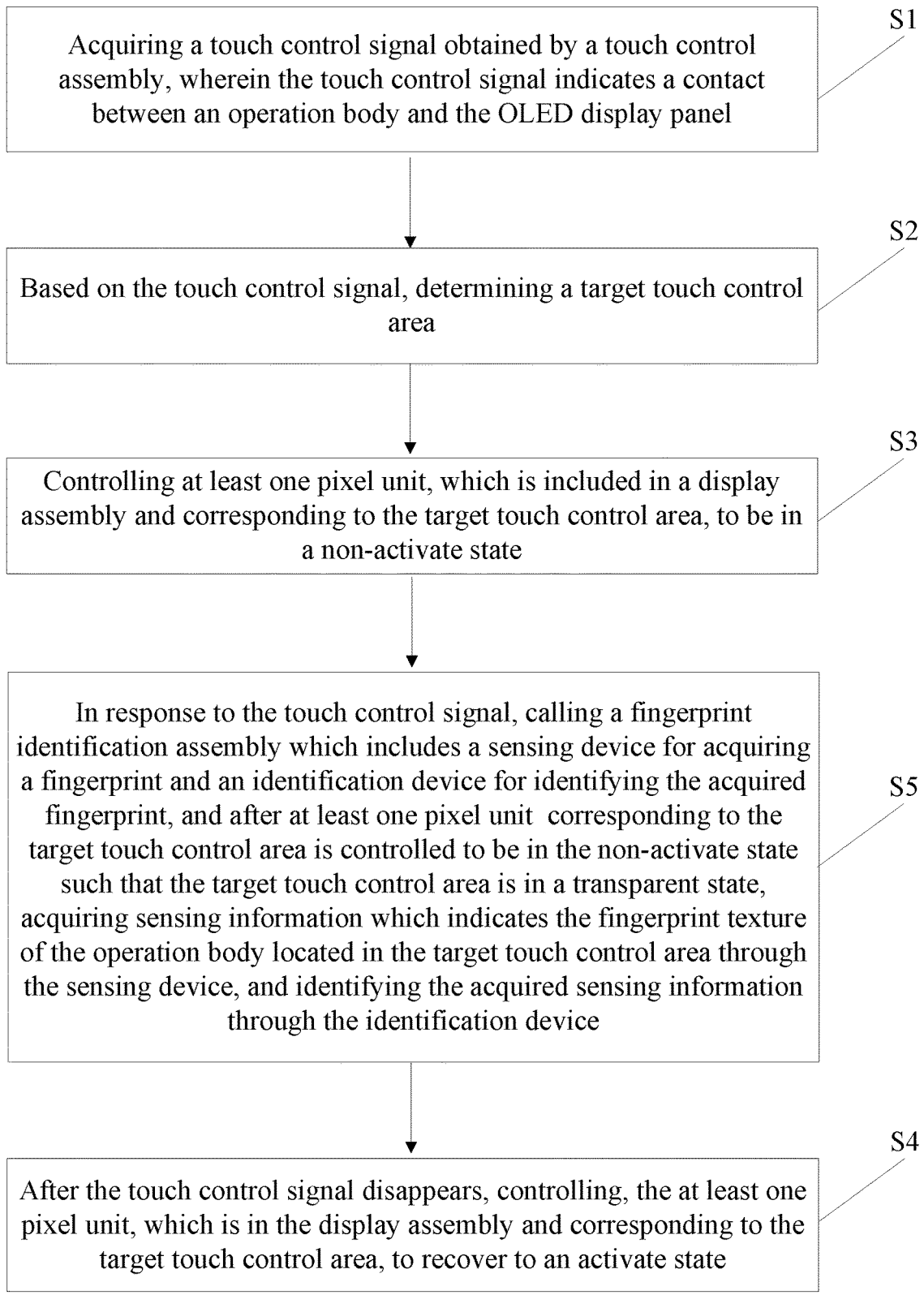
FIG. 2 illustrates a flow chart of another example OLED display panel controlling method consistent with disclosed embodiments.

With the development of display technologies, fingerprint recognition technologies are gradually applied to various safety applications of the display panels. To improve the safety of various operations on the OLED display panel such as unlocking the OLED display panel or paying by the OLED display panel, in another embodiment, as shown in FIG. 2, in addition to the steps S1-S4, the OLED display panel controlling method may further comprise: in response to the touch control signal, calling a fingerprint identification assembly which comprises a sensing device for acquiring a fingerprint and an identification device for identifying the acquired fingerprint, and after the at least one pixel corresponding to the target touch control area is controlled to be in the non-active state such that the target touch control area is in a transparent state, acquiring sensing information which indicates the fingerprint texture of the operation body located in the target touch control area through the sensing device, and identifying the sensing information acquired by the sensing device through the identification device (S5). In particular, the sensing device may correspond to the target touch control area.

In the disclosed embodiments, the sensing device may comprise any appropriate sensors capable of sensing the information (e.g., voltage, current) which indicates the fingerprint texture of the operation body located in the target touch control area. The identification device may comprise any appropriate devices capable of identifying the sensing information acquired by the sensing device. For example, the identification device may comprise an identification circuit which is capable of identifying the sensing information acquired by the sensing device.

In the disclosed embodiments, through controlling at least one pixel corresponding to the target touch control area to be in the non-active state such that the target touch control area is in the transparent state, the acquisition of the sensing information, which indicates the fingerprint texture of the operation body located in the target touch control area, may be facilitated and, meanwhile, the power consumption of the OLED display panel may be reduced.

In one embodiment, controlling at least one pixel corresponding to the target touch control area to be in the non-active state such that the target touch control area is in the transparent state may further comprise: inactivating at least one pixel corresponding to the target touch control area, such that a portion of the target touch control area, where the portion of the target touch control area is located between the touch control assembly and the sensing device, may be in the transparent state. Accordingly, the sensing device may be ensured to acquire the sensing information which indicates the fingerprint texture of the operation body located in the target touch control area.

In another embodiment, controlling at least one pixel corresponding to the target touch control area to be in the non-active state such that the target touch control area is in the transparent state may further comprise: inactivating at least one pixel corresponding to the target touch control area, such that a portion of the OLED display panel, where the portion of the OLED display panel is corresponding to the target touch control area, may be all in the transparent state.

In certain embodiments, the sensing device may be located on a back surface of the OLED display panel, and the back surface of the OLED display panel may be arranged opposite to the touch surface of the OLED display panel, which is for illustrative purposes and is not intended to limit the scope of the present disclosure.

In the disclosed embodiments, when the target touch control area is in the transparent state, the target touch control area may be in a transparent state satisfying a preset transparency. For example, the preset transparency may be 100%, 50% 60%, 70%, 80%, or 90% or other appropriate values, which is not limited by the present disclosure, as long as the sensing device is ensured to acquire the sensing information which indicates the fingerprint texture of the operation body located in the target touch control area.

In one embodiment, a touch control area corresponding to the touch control assembly may overlap with an acquisition area formed by a plurality of sensing devices, such that as long as the target touch control area is located within the touch control area, the sensing device may be ensured to acquire the sensing information which indicates the fingerprint texture of the operation body located in the target touch control area.

In the disclosed embodiments, the touch control area corresponding to the touch control assembly may be substantially large. Given the touch control area corresponding to the touch control assembly is larger than the target touch control area, depending on different positions where the touch control (i.e., the contact between the operation body and the OLED display panel) occurs, the corresponding pixels which are going to be non-active may be different and, meanwhile, the sensing devices which are going to be enabled/active may be different. That is, when the target touch control area varies, the corresponding pixels which are going to be non-active may be different and, meanwhile, the sensing devices which are going to be enabled may also be different.

Figure 4:
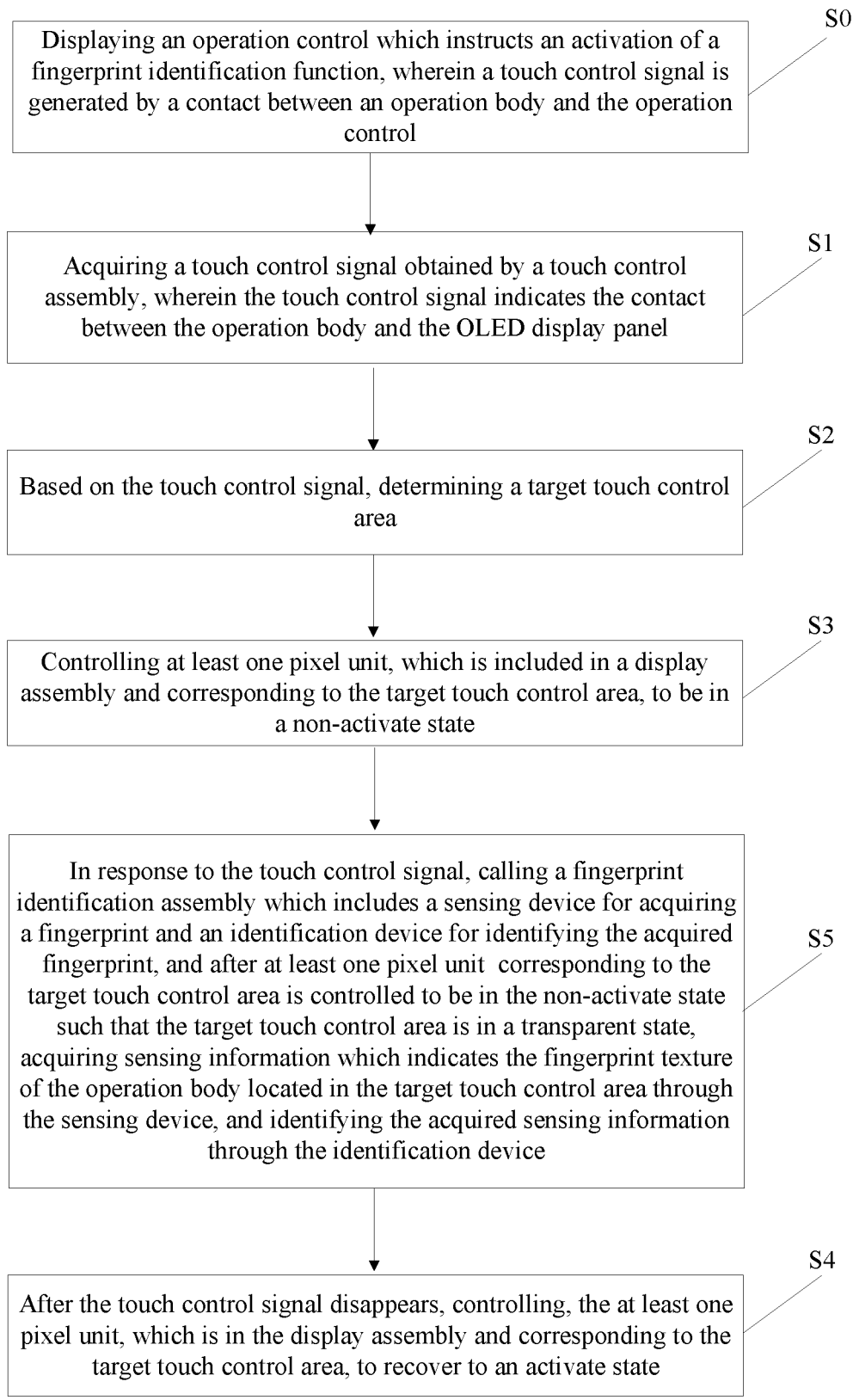
FIG. 4 illustrates a flow chart of another example OLED display panel controlling method consistent with disclosed embodiments.

In one embodiment, as shown in FIG. 4, the OLED display panel controlling method may further comprise: displaying an operation control, wherein the operation control instructs an activation of a fingerprint identification function (i.e., instructs a fingerprint identification function to be active), wherein the touch control signal is generated by a contact between the operation body and the operation control (S0).

For example, when a payment operation is going to be performed on the OLED display panel, the OLED display panel may first display the operation control. The operation body may contact the operation control to generate the touch control signal, and the touch control assembly may detect the generated touch control signal. The OLED display panel may obtain the touch control signal detected by the touch control assembly, then determine the target touch control area based on the obtained touch control signal, and control at least one pixel, which is in the display assembly of the OLED display panel and corresponding to the target touch control area, to be in the non-active state. Thus, the power consumption of the OLED display panel may be reduced. Then the OLED display panel may acquire the sensing information through the sensing device, in which the sensing information may indicate the fingerprint texture of the operation body located in the target touch control area. The OLED display panel may identify the acquired sensing information through the identification device, thereby completing the payment operation. After the touch control signal disappears, the at least one pixel, which is in the display assembly of the OLED display panel and corresponding to the target touch control area, may be controlled to recover to the active state, thereby resuming the normal display of the at least one pixel.

The present disclosure further provides an OLED display panel capable of reducing the power consumption of the OLED display screen.

Figure 3:
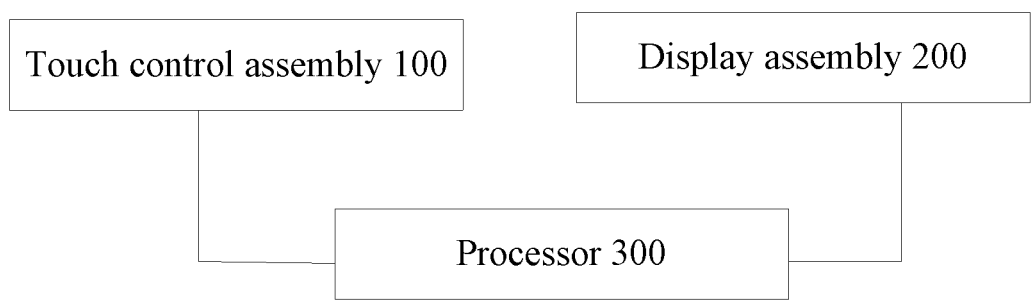
FIG. 3 illustrates a block diagram of an example OLED display panel consistent with disclosed embodiments.

FIG. 3 illustrates a block diagram of an example OLED display panel consistent with disclosed embodiments. As shown in FIG. 3, the display panel may comprise a touch control assembly 100, a display assembly 200, and a processor 300.

The processor 300 may acquire a touch control signal obtained by the touch control assembly 100. The touch control signal may indicate a contact between an operation body and the OLED display panel. Based on the acquired touch control signal, the processor 300 may determine a target touch control area. Based on the target touch control area, the processor 300 may control at least one pixel, which is included in the display assembly 200 and corresponding to the target touch control area, to be in a non-active state. Thus, the power consumption of the OLED display panel may be reduced.

After the touch control signal disappears, the processor 300 may control the at least one pixel corresponding to the target touch control area to be in the active state. That is, after the touch control signal disappears, the processor 300 may control the at least one pixel, which is included in the display assembly 200 and corresponding to the target touch control area, to recover to the active state, thereby ensuring the normal display of the target touch control area after the target touch control area is no longer covered by the operating body.

In one embodiment, when determining the target touch control area based on the acquired touch control signal, the processor 300 may determine a touch control position and a touch control area based on the acquired touch control signal, then determine the target touch control area based on the touch control position and the touch control area. The target touch control area may be a contact area of the operating body and the OLED display panel.

In the disclosed embodiments, the display assembly 200 of the OLED display panel may comprise a plurality of pixels. After the operating body is in contact with the OLED display panel at the contact area, even the pixels corresponding to the contact area are in the active state, the operating body may be still unable to acquire the display content at the contact area (i.e., the content displayed at the contact area). Thus, after determining the target touch control area, the processor 300 may control at least one pixel, which is included in the display assembly 200 and corresponding to the target touch control area, to be in the non-active state and, accordingly, the power consumption of the OLED display panel may be reduced.

In one embodiment, when the processor 300 controls at least one pixel, which is included in the display assembly 200 and corresponding to the target touch control area, to be in the non-active state, the processor 300 may control one pixel, which is included in the display assembly 200 and corresponding to the target touch control area, to be in the non-active state, thereby reducing the power consumption of the OLED display panel.

In another embodiment, when the processor 300 controls at least one pixel, which is included in the display assembly 200 and corresponding to the target touch control area, to be in the non-active state, the processor 300 may control a plurality of pixels, which are included in the display assembly 200 and corresponding to the target touch control area, to be in the non-active state, thereby further reducing the power consumption of the OLED display panel.

In another embodiment, when the processor 300 controls at least one pixel, which is included in the display assembly 200 and corresponding to the target touch control area, to be in the non-active state, the processor 300 may control each pixel, which is included in the display assembly 200 and corresponding to the target touch control area, to be in the non-active state, thereby maximumly reducing the power consumption of the OLED display panel.

In practical applications, the number of the pixels, which are corresponding to the target touch control area and are controlled to be in the non-active state, may be determined according to various application scenarios, which is not limited by the present disclosure, as long as the area occupied by the non-active pixels does not extend beyond the target touch control area.

In a period during which the operating body is in contact with the OLED display panel, the at least one pixel, which is in the display assembly 200 of the OLED display panel and corresponding to the target touch control area, may be controlled to be in the non-active state. However, each pixel, which is in the display assembly 200 of the OLED display panel and corresponding to a non-target touch control area (i.e., an area beyond the target touch control area), may be still in the active state, thereby ensuring the normal display of the pixels corresponding to the non-target touch control.

With the development of display technologies, fingerprint recognition technologies are gradually applied to the safety applications of the display panels. To improve the safety of various operations on the OLED display panel, such as unlocking the OLED display panel or paying by the OLED display panel, in one embodiment, the OLED display panel may further comprise a fingerprint identification assembly. The fingerprint identification assembly may comprise a sensing device for acquiring a fingerprint and an identification device for identifying the acquired fingerprint. The sensing device may correspond to the target touch control area.

The processor 300 may call the fingerprint identification assembly in response to the touch control signal. After at least one pixel corresponding to the target touch control area is controlled to be in the non-active state such that the target touch control area is in a transparent state, the processor 300 may acquire the sensing information, which indicates the fingerprint texture of the operation body located in the target touch control area, through the sensing device, and identify the acquired sensing information through the identification device.

In one embodiment, when the processor 300 controls at least one pixel corresponding to the target touch control area to be in the non-active state such that the target touch control area is in the transparent state, the processor 300 may control at least one pixel corresponding to the target touch control area to be non-active, such that a portion of the target touch control area may be in the transparent state, where the portion of the target touch control area is located between the touch control assembly 100 and the sensing device, and the sensing device may be ensured to acquire the sensing information. The sensing information may indicate the fingerprint texture of the operation body located in the target touch control area.

In another embodiment, when the processor 300 controls at least one pixel corresponding to the target touch control area to be in the non-active state such that the target touch control area is in the transparent state, the processor 300 may control at least one pixel corresponding to the target touch control area to be non-active, such that a portion of the OLED display panel may be all in the transparent state, where the portion of the OLED display panel is corresponding to the target touch control area.

In the disclosed embodiments, the sensing device may be located on a back surface of the OLED display panel, and the back surface of the OLED display panel may be arranged opposite to the touch surface of the OLED display panel, which is for illustrative purposes and is not intended to limit the scope of the present disclosure.

In the disclosed embodiments, when the target touch control area is in the transparent state, the target touch control area may be in a transparent state satisfying a preset transparency. The preset transparency may be 100%, 50% 60%, 70%, 80%, 90%, or any other appropriate values, which is not limited by the present disclosure, as long as the sensing device is ensured to acquire the sensing information which indicates the fingerprint texture of the operation body located in the target touch control area.

In one embodiment, a touch control area corresponding to the touch control assembly 100 may overlap with an acquisition area formed by a plurality of sensing devices, such that as long as the target touch control area is located within the touch control area, the sensing device may always acquire the sensing information which indicates the fingerprint texture of the operation body located in the target touch control area.

In the disclosed embodiments, the touch control area corresponding to the touch control assembly 100 may be substantially large. Given the touch control area corresponding to the touch control assembly 100 is larger than the target touch control area, depending on different positions where the touch control occurs, the corresponding pixels which are going to be non-active may be different and, meanwhile, and the sensing devices which are going to be enabled/active may also be different. That is, for different target touch control area, the pixels which are going to be non-active may be different, and the sensing devices which are going to be enabled may also be different.

In one embodiment, the display assembly 200 may also display an operation control. The operation control may instruct an activation of a fingerprint identification function, i.e., instruct a fingerprint identification function to be active. The touch control signal may be generated by a contact between the operation body and the operation control.

For example, to perform an unlocking operation on the OLED display panel, the OLED display panel may first display the operation control. The operation body may contact the operation control to generate the touch control signal, and the touch control assembly 100 may detect the generated touch control signal. The OLED display panel may obtain the touch control signal detected by the touch control assembly 100, then determine the target touch control area based on the touch control signal, and control at least one pixel, which is in the display assembly 200 and corresponding to the target touch control area, to be in the non-active state. Thus, the power consumption of the OLED display panel may be reduced.

The OLED display panel may also acquire the sensing information, which indicates the fingerprint texture of the operation body located in the target touch control area, through the sensing device, and identify the acquired sensing information through the identification device. Thus, the OLED display panel may be unlocked. After the touch control signal disappears, the OLED display panel may control the at least one pixel, which is in the display assembly 200 and corresponding to the target touch control area, to recover to the active state, thereby resuming the normal display of the at least one pixel.

In the disclosed embodiments, the display assembly 200 may be a screen. The processor 300 may comprise, for example, general purpose microprocessors, instruction set processors, and/or associated chipsets, and/or special purpose microprocessors (e.g., application specific integrated circuits (ASICs)), etc. The processor 300 may also include an on-board memory for caching purposes. The processor 300 may be a single processing unit or a plurality of processing units which perform any disclosed OLED display panel controlling methods.

In the disclosed OLED display panel and the controlling method thereof, in the period during which the operation body is in contact with the OLED display panel, the touch control signal obtained by the touch control assembly of the OLED display panel may be acquired. Based on the acquired touch control signal, the target touch control area may be determined. Based on the target touch control area, at least one pixel, which is in the display assembly of the OLED display panel and corresponding to the target touch control area, may be controlled to be in the non-active state, thereby reducing the power consumption of the OLED display panel. After the touch control signal disappears, the at least one pixel, which is in the display assembly and corresponding to the target touch control area, may be controlled to recover to the active state, thereby ensuring the normal display of the target touch control area.

Figure 5:
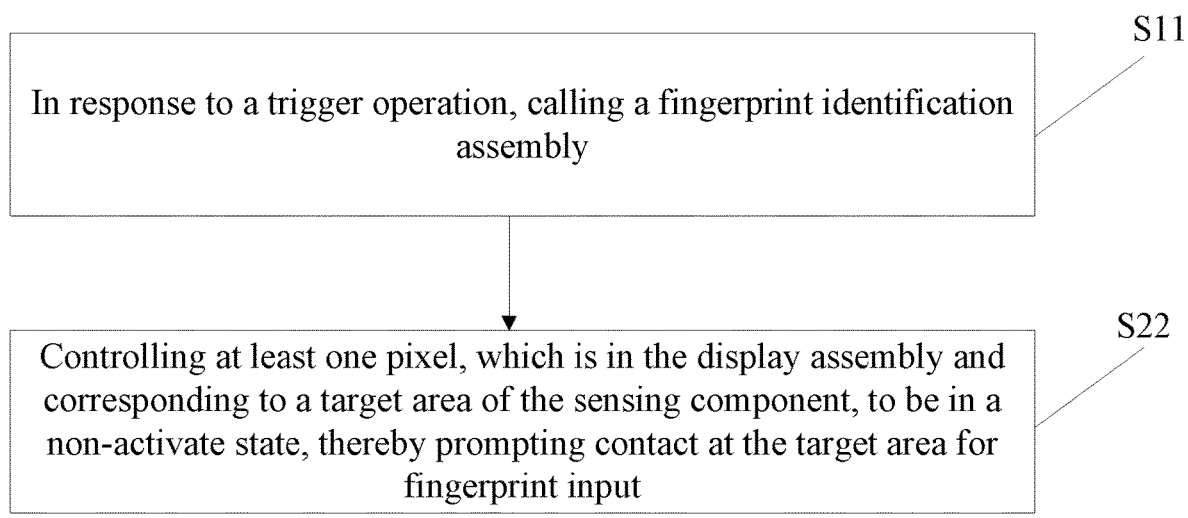
FIG. 5 illustrates a flow chart of another example OLED display panel controlling method consistent with disclosed embodiments.

In certain embodiments, as shown in FIG. 5, the OLED display panel controlling method may comprise: in response to a trigger operation, calling a fingerprint identification assembly of the OLED display panel (S11). The fingerprint identification assembly may comprise a sensing device for acquiring fingerprint and an identification device for identifying the acquired fingerprint. The OLED display panel controlling method may further comprise: controlling at least one pixel, which is in the display assembly and corresponding to a target area of the sensing device, to be in the non-active state, thereby prompting the operation body to contact the target area for fingerprint input (S22).

In the disclosed embodiments, the trigger operation may be a key operation, a touch control operation, or any other appropriate types of trigger operations, which is not limited by the present disclosure.

In an operation, the OLED display panel controlling method may comprise: in response to the trigger operation, controlling at least one pixel, which is in the display assembly and corresponding to the target area of the sensing device, to be in the non-active state, such that a distinctive display area which indicates a location of the target area may be formed, and the operation body may be prompted to contact the target area for fingerprint input. The OLED display panel controlling method may further comprise: calling the fingerprint identification assembly of the OLED display panel, after the fingerprint is inputted, acquiring sensing information which indicates the fingerprint texture of the operation body located in the target area through the sensing device, and identifying the acquired sensing information through the identification device.

In the disclosed embodiments, in a period during which at least one pixel which is in the display assembly of the OLED display panel and corresponding to the target area of the sensing device in the fingerprint identification assembly is in the non-active state, other pixels in the display assembly of the OLED display panel, except the at least one pixel in the non-active state, may be still in the active state, thereby ensuring the normal display of other pixels in the display assembly of the OLED display panel.

In the disclosed embodiments, to facilitate the sensing device to acquire the sensing information which indicates the fingerprint texture of the operation body located in the target area, after controlling at least one pixel, which is in the display assembly of the OLED display panel and corresponding to the target area of the sensing device in the fingerprint identification assembly, to be in the non-active state, an area corresponding to the at least one pixel may be a transparent area. In one embodiment, the transparent area may be a completely transparent area, in another embodiment, the transparent area may be a semi-transparent area, and in another embodiment, the transparent area may be an area satisfying a preset transparency, which is not limited by the present disclosure, as long as the sensing device is ensured to acquire the sensing information which indicates the fingerprint texture of the operation body located at the at least one pixel.

In one embodiment, controlling at least one pixel, which is in the display assembly and corresponding to the target area of the sensing device, to be in the non-active state may comprise: controlling one pixel, which is in the display assembly and corresponding to the target area of the sensing device, to be in the non-active state, thereby forming the distinctive display area and, meanwhile, reducing the power consumption of the OLED display panel.

In another embodiment, controlling at least one pixel, which is in the display assembly and corresponding to the target area of the sensing device, to be in the non-active state may comprise: controlling a plurality of pixels, which are in the display assembly and corresponding to the target area of the sensing device, to be in the non-active state, thereby forming the distinctive display area and, meanwhile, further reducing the power consumption of the OLED display panel.

In another embodiment, controlling at least one pixel, which is in the display assembly and corresponding to the target area of the sensing device, to be in the non-active state may comprise: controlling each pixel, which is in the display assembly and corresponding to the target area of the sensing device, to be in the non-active state, thereby forming the distinctive display area and, meanwhile, maximally reducing the power consumption of the OLED display panel.

In practical applications, the number of the pixels, which are corresponding to the target area of the sensing device and controlled to be in the non-active state, may be determined according to various application scenarios.

In another embodiment, the OLED display panel controlling method may further comprise: after the operation body is no longer in contact with the target area, controlling the at least one pixel, which is in the display assembly of the OLED display panel and corresponding to the target area of the sensing device, to recover to the active state, thereby ensuring the normal display of the at least one pixel.

Further, in the disclosed embodiments, depending on different non-active pixels, the target area may correspond to different positions, and the sensing devices which are going to be enabled/active may be different.

Accordingly, the present disclosure also provides an OLED display panel.

The OLED display panel may comprise a fingerprint identification assembly and a processor. The fingerprint identification assembly may comprise a sensing device for acquiring a fingerprint and an identification device for identifying the acquired fingerprint. The processor may call the fingerprint identification assembly of the OLED display panel, and control at least one pixel, which is in the display assembly and corresponding to a target area of the sensing device, to be in the non-active state, thereby prompting contact at the target area for fingerprint input.

In the disclosed embodiments, the trigger operation may be a key operation, a touch control operation, or any other appropriate types of trigger operations, which is not limited by the present disclosure.

In an operation, in response to the trigger operation, the processor may control at least one pixel, which is in the display assembly and corresponding to the target area of the sensing device, to be in the non-active state, such that a distinctive display area which indicates a location of the target area may be formed, and the operation body may be prompted to contact the target area for fingerprint input. That is, a contact at the target area for fingerprint input may be prompted. The processor may call the fingerprint identification assembly of the OLED display panel, such that after the fingerprint is inputted, the processor may acquire the sensing information which indicates the fingerprint texture of the operation body located in the target area through the sensing device, then analyze and identify the acquired sensing information through the identification device.

In the disclosed embodiments, at least one pixel, which is in the display assembly of the OLED display panel and corresponding to the target area of the sensing device in the fingerprint identification assembly, may be in the non-active state. However, other pixels in the display assembly of the OLED display panel, except the at least one pixel in the non-active state, may be still in the active state, thereby ensuring the normal display of other pixels in the display assembly of the OLED display panel.

In the disclosed embodiments, to facilitate the sensing device to acquire the sensing information which indicates the fingerprint texture of the operation body located in the target area, in a period during which at least one pixel, which is in the display assembly of the OLED display panel and corresponding to the target area of the sensing device in the fingerprint identification assembly, is in the non-active state, the area corresponding to the at least one pixel may be a transparent area.

In one embodiment, the transparent area may be a completely transparent area, in another embodiment, the transparent area may be a semi-transparent area, and in another embodiment, the transparent area may be an area satisfying a preset transparency, which is not limited by the present disclosure, as long as the sensing device is ensured to acquire the sensing information which indicates the fingerprint texture of the operation body located at the at least one pixel.

In one embodiment, when the processor controls at least one pixel, which is in the display assembly and corresponding to the target area of the sensing device, to be in the non-active state, the processor may control one pixel, which is in the display assembly and corresponding to the target area, to be in the non-active state, thereby forming the distinctive display area and, meanwhile, reducing the power consumption of the OLED display panel.

In another embodiment, when the processor controls at least one pixel, which is in the display assembly and corresponding to the target area of the sensing device, to be in the non-active state, the processor may control a plurality of pixels, which are in the display assembly and corresponding to the target area, to be in the non-active state, thereby forming the distinctive display area and, meanwhile, further reducing the power consumption of the OLED display panel.

In another embodiment, when the processor controls at least one pixel, which is in the display assembly and corresponding to the target area of the sensing device, to be in the non-active state, the processor may control each pixel, which is in the display assembly and corresponding to the target area, to be in the non-active state, thereby forming the distinctive display area and, meanwhile, maximally reducing the power consumption of the OLED display panel.

In practical applications, the number of the pixels, which are corresponding to the target area and controlled to be in the non-active state, may be determined according to various application scenarios.

In another embodiment, after the operation body is no longer in contact with the target area, the processor may control the at least one pixel, which is in the display assembly of the OLED display panel and corresponding to the target area of the sensing device, to recover to the active state, thereby ensuring the normal display of the at least one pixel.

Further, in the disclosed embodiments, depending on different non-active pixels, the target area may correspond to different positions, and the sensors which are going to be enabled/active may also be different.

In summary, in the disclosed OLED display panel and the controlling method thereof, in response to a trigger operation, the fingerprint identification assembly of the OLED display panel may be called. The fingerprint identification assembly may comprise the sensing device for acquiring the fingerprint and the identification device for identifying the acquired fingerprint. At least one pixel, which is in the display assembly and corresponding to the target area of the sensing device, may be controlled to be in the non-active state, thereby prompting contact at the target area for fingerprint input and, meanwhile, reducing the power consumption of the OLED display panel.

In the disclosed embodiments, after an operating body is in contact with an OLED display panel, a touch control signal obtained by a touch control assembly of the OLED display panel may be acquired. Based on the acquired touch control signal, a target touch control area may be determined. Based on the determined target touch control area, at least one pixel, which is included in the display assembly and corresponding to the target touch control area, may be controlled to be in a non-active state. Thus, the power consumption of the OLED display panel may be reduced.

In addition, because the at least one non-active pixel (for example, at least one non-active OLED) is in a transparent or semi-transparent state, in one embodiment, an acquisition region of a fingerprint sensor may be disposed beneath the OLED (i.e., fingerprint identification under a display screen).

In certain embodiments, the acquisition region may have a same size as the display region of the OLED screen and may be stacked with the display region of the OLED screen. To identify a fingerprint, after the user presses the OLED screen, an OLED region corresponding to the finger may be non-active and become a transparent state, such that the fingerprints captured by the fingerprint sensor may have an improved accuracy and suppressed interferences. After the finger is no longer in contact with the OLED screen, the OLED region previously corresponding to the finger may recover to the active state. The user may not visually observe the non-active state of the OLEDs in the OLED region, instead, the user may feel the fingerprints are captured in a period during which the OLED display is always in the active state. Thus, the power consumption of the OLED display panel may be reduced and, meanwhile, the consistent user experience may be realized.

In certain other embodiments, the acquisition region of the fingerprint sensor may only correspond to a local area of the OLED screen, in which the local area is only used for fingerprint identification. After the electronic device determines that a fingerprint needs to be identified, at least one pixel or all the pixels in the local area of the OLED screen may be non-active, while the pixels in other areas outside the local area may remain in the active state, in which the local area of the OLED screen is corresponding to the acquisition region of the fingerprint sensor. Through the above control of the OLED screen, the user may be provided with a visual difference which may prompt the user that the local area of the OLED screen is used for acquiring fingerprints, and the user may put his finger on the local area. Because the local area of the OLED screen is already in the non-active state before the user presses the OLED screen, the power consumption of the OLED display panel may be further reduced, as compared with the embodiment in which the OLED region corresponding to the finger is non-active after the user presses the OLED screen.

Various embodiments of the present specification are described in a progressive manner, in which each embodiment focusing on aspects different from other embodiments, and the same and similar parts of each embodiment may be referred to each other. Since the disclosed electronic device corresponds to the disclosed control method, the description of the disclosed electronic device is relatively simple, and the correlation may be referred to the method section.

Various embodiments have been described to illustrate the operation principles and example implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An organic light-emitting diode (OLED) display panel controlling method, comprising:
   acquiring a touch control signal obtained by a touch control assembly, wherein the touch control signal indicates a contact between an operation body and an OLED display panel;
   based on the touch control signal, determining a target touch control area;
   in response to the touch control signal, calling a fingerprint identification assembly, the fingerprint identification assembly comprising a sensing device for acquiring a fingerprint and an identification device for identifying the fingerprint, and the sensing device corresponding to the target touch control area;
   controlling at least one pixel, which is included in a display assembly and corresponding to the target touch control area, to be in a non-active state, such that the target touch control area is in a transparent state;
   acquiring sensing information through the sensing device, wherein the sensing information indicates a fingerprint texture of the operation body located in the target touch control area; and
   identifying the sensing information through the identification device.

2. The controlling method according to claim 1, further comprising:
   after the touch control signal disappears, controlling, the at least one pixel, which is in the display assembly and corresponding to the target touch control area, to recover to an active state.

3. The controlling method according to claim 1, wherein based on the touch control signal, determining the target touch control area further comprises:
   based on the touch control signal, determining a touch control position and a touch control area of the touch control signal; and
   based on the touch control position and the touch control area of the touch control signal, determining the target touch control area.

4. The controlling method according to claim 1, wherein:
   a touch control area corresponding to the touch control assembly overlaps with an acquisition area formed by a plurality of sensing devices;
   the display assembly comprises a plurality of pixels; and
   depending on a different position where the contact between the operation body and the OLED display panel occurs, a pixel which is going to be non-active is different, and a sensing device which is going to be active is different.

5. The controlling method according to claim 1, further comprising:
   displaying an operation control,
   wherein the operation control instructs an activation of a fingerprint identification function, and the touch control signal is generated by a contact between the operation body and the operation control.

6. An organic light-emitting diode (OLED) display panel controlling method, comprising:
   calling a fingerprint identification assembly, wherein the fingerprint identification assembly comprises a sensing device for acquiring a fingerprint and an identification device for identifying the fingerprint;
   controlling at least one pixel, which is in a display assembly and corresponding to a target area of the sensing device, to be in a non-active state, such that the target area is in a transparent state, prompting contact at the target area for fingerprint input;

acquiring sensing information through the sensing device, wherein the sensing information indicates a fingerprint texture of the operation body located in the target area; and identifying the sensing information through the identification device.

7. An organic light-emitting diode (OLED) display panel, comprising:
- a touch control assembly;
- a display assembly;
- a fingerprint identification assembly including a sensing device for acquiring a fingerprint and an identification device for identifying the fingerprint; and
- a processor, wherein the processor:
  - acquires a touch control signal obtained by the touch control assembly, wherein the touch control signal indicates a contact between an operation body and the OLED display panel,
  - based on the touch control signal, determines a target touch control area,
  - in response to the touch control signal, calls the fingerprint identification assembly, the sensing device corresponding to the target touch control area,
  - controls at least one pixel, which is included in the display assembly and corresponding to the target touch control area, to be in a non-active state, such that the target touch control area is in a transparent state,
  - acquires sensing information through the sensing device, wherein the sensing information indicates a fingerprint texture of the operation body located in the target touch control area; and
  - identifies the sensing information through the identification device.

8. The OLED display panel according to claim 7, wherein the processor:
- after the touch control signal disappears, controls, the at least one pixel, which is in the display assembly and corresponding to the target touch control area, to recover to an active state.

9. The OLED display panel according to claim 7, wherein the processor:
- based on the touch control signal, determines a touch control position and a touch control area of the touch control signal; and
- based on the touch control position and the touch control area of the touch control signal, determines the target touch control area.

10. The OLED display panel according to claim 7, wherein:
- a touch control area corresponding to the touch control assembly overlaps with an acquisition area formed by a plurality of sensing devices;
- the display assembly comprises a plurality of pixels; and
- depending on a different position where the contact between the operation body and the OLED display panel occurs, a pixel which is going to be non-active is different, and a sensing device which is going to be active is different.

11. The OLED display panel according to claim 7, wherein:
- the display assembly displays an operation control,
- wherein the operation control instructs an activation of a fingerprint identification function, and the touch control signal is generated by a contact between the operation body and the operation control.

12. An organic light-emitting diode (OLED) display panel, comprising:
- a fingerprint identification assembly, wherein the fingerprint identification assembly comprises a sensing device for acquiring a fingerprint and an identification device for identifying the fingerprint; and
- a processor, wherein the processor:
  - calls the fingerprint identification assembly;
  - controls at least one pixel, which is in a display assembly and corresponding to a target area of the sensing device, to be in a non-active state, such that the target area is in a transparent state, prompting contact at the target area for fingerprint input;
  - acquires sensing information through the sensing device, wherein the sensing information indicates a fingerprint texture of the operation body located in the target area; and
  - identifies the sensing information through the identification device.

* * * * *